United States Patent [19]

Poehler

[11] Patent Number: 4,687,166
[45] Date of Patent: Aug. 18, 1987

[54] SWIVEL ARM

[75] Inventor: Hermann Poehler, Ober-Morlen, Fed. Rep. of Germany

[73] Assignee: MAP Mikrofilm Apparatebau Dr. Poehler GmbH & Co. KG, Ober-Morlen, Fed. Rep. of Germany

[21] Appl. No.: 760,553

[22] Filed: Jul. 30, 1985

[30] Foreign Application Priority Data

Aug. 20, 1984 [DE] Fed. Rep. of Germany ....... 3430565

[51] Int. Cl.$^4$ .............................................. E04G 3/03
[52] U.S. Cl. .................................... 248/279; 248/287
[58] Field of Search ............... 248/279, 278, 285, 286, 248/287, 657, 122, 125, 295.1; 312/196; 108/140

[56] References Cited

U.S. PATENT DOCUMENTS

| 1,797,847 | 3/1931 | Vandagriff | 248/279 X |
| 3,358,957 | 12/1967 | Lindenmuth | 248/279 |
| 3,399,856 | 9/1968 | Pecaut | 248/279 |
| 3,929,309 | 12/1975 | DeVore | 248/279 X |
| 4,410,158 | 10/1983 | Maffei | 248/279 X |

Primary Examiner—Ramon O. Ramirez
Attorney, Agent, or Firm—Wegner & Bretschneider

[57] ABSTRACT

A swivel arm featuring a cantilever capable of swiveling about a vertical pillar. Said pillar can be fixed at a desk by means of a locating plate and a clamping arm. A board with straight guides holding a carrying frame, the latter being designed as a cage and being vertically movable, is mounted at the free end of the cantilever and can be pivoted about a vertical pin. Said carrying frame serves to accommodate the appliance to be held by the swivel arm. The cantilever consists of a rectangular hollow section and of a supporting plate capable of being extended from it in a telescope-type manner. Guiding of the supporting plate in the rectangular hollow section is effected via upper rails, extension rails and further upper rails, similarly to a drawer.

16 Claims, 4 Drawing Figures

SWIVEL ARM

BACKGROUND OF THE INVENTION

This invention relates to a swivel arm for supporting an appliance designed for use on a desk and more particularly this invention relates to a swivel arm for supporting a microfilm reader, having a telescope-type cantilever capable of swiveling about a pillar that can be vertically fixed to the desk, with a carrying frame for accommodating the appliance being provided at the end of the telescope-type cantilever.

Swivel arms of this kind are known and commonly used for supporting a telephone set. In the majority of cases they are employed to be able to swivel one individual telephone set in such a manner that it moves within the respective working area of two persons sitting at two desks placed side by side. The cantilever is supported on the vertical pillar about which it can swivel approximately 20 cm above the desk top, rendering it impossible for the cantilever to hit against objects on the desk. In order to be able to also adjust the distance between the carrying frame and the vertical pillar, the cantilever consists of two telescoping tubular sections. Manually releasable brakes retain the swivel arm in its respective positions, so that it does not intentionally move out of position when the dial of the telephone is operated.

Most recently even higher demands are being made on the ergonometrically correct dimensioning and positioning of appliances to be used at the working areas of individual operators. This is particularly true of microfilm readers or computer display units. With such appliances it is not only of importance that they have an optimal distance and angle in relation to the operator's eyes, but it is of essence that the display unit remain free of reflection, which impairs reading from the display unit. Hence, in supporting such appliances one has to provide for more freedom of adjustment than with telephone swivel arms hitherto known. In this connection it has to be kept in mind that a vertical adjustment of the cantilever on the vertical pillar can, for instance, not be considered, since the possibility of the cantilever pushing away objects on the desk when swiveled at a height of less than 20 cm above the desk top must be considered.

It is a primary object of this invention to design a swivel arm of the kind mentioned at the beginning in such a manner that even the level of an appliance held by it can be optimally adjusted, eliminating the possibility of the swivel arm being obstructed by objects on the desk when swiveling over it.

This object is established according to the invention in that the carrying frame is fixed at the end of the cantilever and in that it is capable of moving in an approximately vertical direction in relation to the cantilever.

This design renders it possible to achieve an optimal vertical adjustment of the appliance held by the carrying frame without a change in the cantilever's level such as predetermined by its design. The cantilever does not, therefore, hit against objects on the desk when being swiveled. Furthermore, it does not obstruct the operator's view by being positioned too high, since it can always be below the operator's eye-level.

A preferred embodiment of the invention provides for the carrying frame being capable of being vertically lowered down to the desk top. This embodiment is of particular advantage with microfilm readers of the keyboard type, since the keyboard can in this case rest on the desk top, which ensures easy operation and support from below and eliminates springing of the cantilever when the keyboard is being used.

The vertical adjustment of the carrying frame can be achieved with special design simplicity when the end of the cantilever is provided with an approximately vertical board having two guide rails, with an approximately vertical portion of the carrying frame gripping over the guide rails with two upper rails. This embodiment furthermore offers the advantage of being very rigid, which counteracts any tendency of vibration.

The carrying frame with the appliance held on it remains in any given vertical position when a tension-compensating flat spring with its associated take-up reel is located in the board and, when the free end of the tension-compensating flat spring reaches through the board and is connected to the carrying frame.

The appliance to be held by the carrying frame is firmly supported and protected from shocks when the carrying frame is designed as a cage that embraces the appliance to be held at least partially on three sides.

Another preferred embodiment of the invention is that the bottom of the carrying frame is capable of tilting about a pin supported in the side walls of the cage and that it can be locked in any desired position. This embodiment allows an infinitely variable fine-adjustment of the angle of inclination of an appliance placed on the carrying frame.

A large angle of inclination can be obtained when the pin of the bottom is positioned in front of the vertical line of gravity of the bottom bearing the load of the appliance to be held and when provision is made of a tension-compensating spring at the back of the bottom.

Since the appliance to be held by the swivel arm of the invention can be of considerable weight, it is imperative that the pillar be as firmly connected as possible to the desk. Experience has shown that fixing such pillars at the protracting edge of a desk top as practiced to date is in many cases not firm enough to resist the moment of tilt brought about by the weight of the appliance. Sufficiently firm support, can, however, be achieved when the vertical pillar has a locating plate that is or can be firmly connected to it and that can be placed on the desk top from above, and when it furthermore has a clamping arm capable of moving on the pillar, with the pillar reaching under the desk body in mounted condition.

Fixing the clamping pillar at the desk can be effected with special ease when the clamping arm consists of two movable clamping plates, with one clamping plate having a fastening screw in a threaded through-hole near its end pointing away from the pillar, with said fastening screw being capable of being pressed against the other clamping plate.

The bending and torsional forces acting in the cantilever are taken up particularly well when the cross-section of the cantilever has the shape of a rectangle pointing downward with its narrow side. A swivel arm with a cantilever of this kind has an extremely low tendency of vibration which is of importance with automatically controlled microfilm readers, since in this case considerable accelerating forces are present as a result of the fast film holder movements.

It is expedient for the design when the cantilever consists of a rectangular hollow section and of a supporting plate of rectangular cross-section that can be extended from it.

It is furthermore advantageous when on both sides of the supporting plate two upper rails are provided respectively that grip over one extension rail each, the latter in turn being connected to upper rails provided at the interior walls of the rectangular hollow section. A telescope-type guide is established in this way which can be manufactured at a relatively low price and which has a very high degree of strength, without the dimensions of the cantilever becoming so large that an undesired obstruction of the operator's view occurs.

The inclination of the carrying frame can be preset in a plurality of discrete positions when an angle bracket provided with several holes in a row is employed to hinge the carrying frame to a pin provided at the end of the supporting plate from above and at a slightly forward inclination, so that the pin reaches through any desired hole in the angle bracket.

The swiveling movement of the carrying frame about its approximately vertical axis at the free end of the cantilever can be influenced in respect of the carrying frame's resistance to change of position when the portion of the pin reaching above the angle bracket is provided with a compression spring, the degree of resilience of said compression spring being adjustable by means of a nut screwed onto the pin.

The carrying frame can be moved into the respective position of operation with special ease when grip handles are at the front end and at the side walls of the carrying frame.

A further preferred embodiment of the invention provides for a brake release lever being arranged on the grip handles for purposes of re-establishing the movability of the swivel arm. The brakes are actuated by releasing the grip handles, and in so doing also the brake release levers are actuated, eliminating the movability of the swivel arm and rendering it impossible for it to move unintentionally when in resting position.

Since in the majority of cases the appliance to be held on the carrying frame requires a power supply, it is advantageous for an electric cord to run through the vertical pillar and the cantilever to the carrying frame. The electric cord, therefore, does not cause any inconvenience on the desk.

BRIEF DESCRIPTION OF THE DRAWINGS

Several designs are possible on the basis of the invention. In order to exemplify their underlying design principle, one of them is illustrated in the drawing and will be described in the following wherein.

DESCRIPTION OF THE PREFERRED EMBODIMENT

Figure 1:
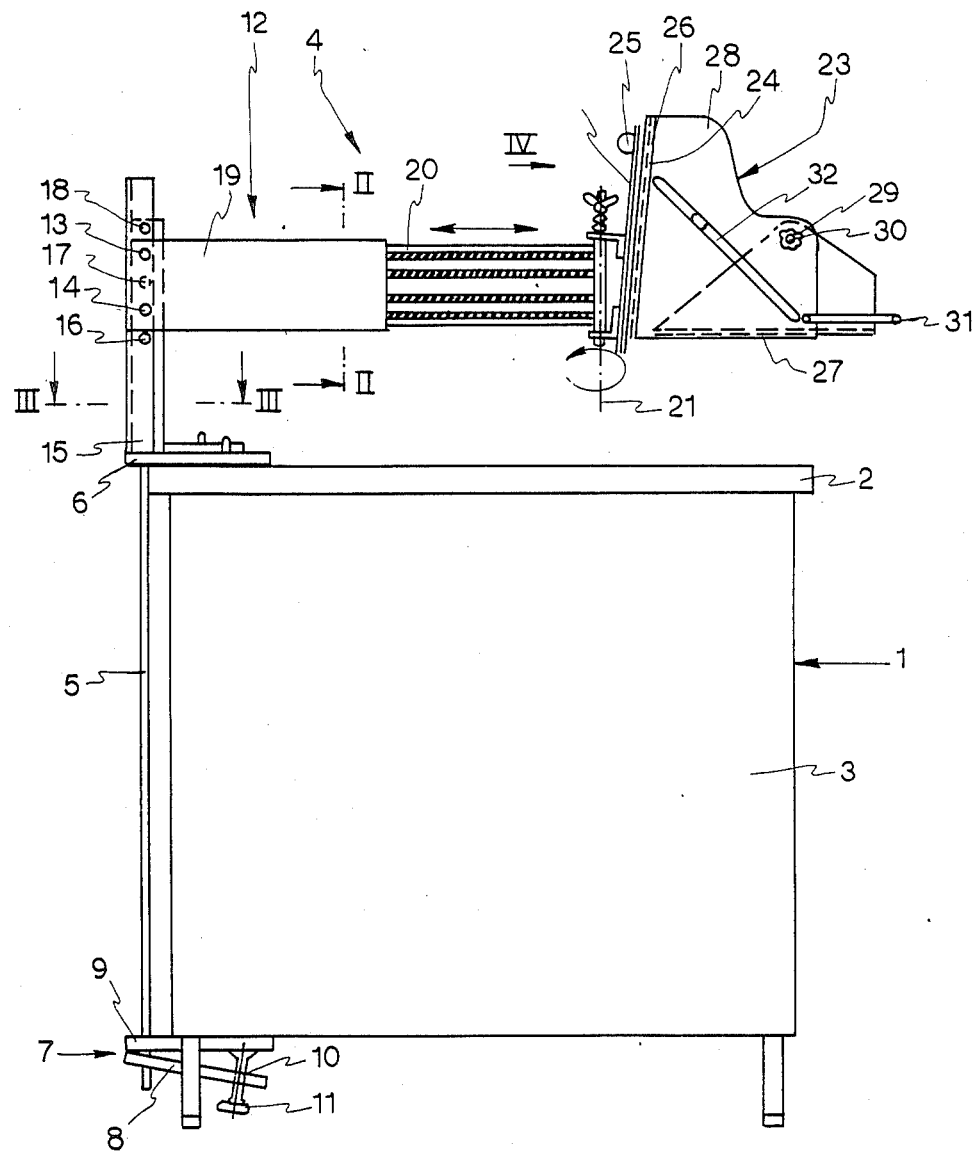
FIG. 1 is an elevational view of a desk to which the swivel arm of the invention is attached.

FIG. 1 is a lateral view of a desk 1 with a desk top 2 and a desk body 3 below. A swivel arm generally referred to with the reference number 4 is fixed at the back of the desk 1. Said swivel arm 4 has a vertical pillar 5 that is firmly supported on a locating plate 6 resting on the desk top 2. The locating plate 6 can either be welded to the pillar 5 or held stationary by means of a releasable pin reaching through the pillar 5. A clamping arm 7 capable of sliding on the pillar 5 comprises two clamping plates 8 and 9 which are slipped onto the pillar 5. The lower clamping plate 8 has a threaded hole 10 through which a fastening screw 11 reaches, with the latter being capable of being pressed against the other clamping plate 9. For purposes of fixing the pillar 5, the same is placed onto the desk top 2 via the locating plate 6, with the clamping plates 8 and 9 being subsequently pushed against the desk body 3 from below. This is followed by a tightening of the fastening screw 11, resulting in the clamping plates 8 and 9 moving apart and in the upper clamping plate 9 being firmly pressed against the desk body 3.

Above the desk top 2 a cantilever 12 is mounted pivotably to the pillar 5. By means of two screws 13 and 14 said cantilever 12 is connected to the load-bearing section 15 that is slipped onto the pillar 5 from above and that rests on the locating plate 6. In addition to the threaded holes for the screws 13 and 14, the former not being marked in the drawing, said load-bearing section 15 has three further threaded holes 16, 17, and 18 rendering it possible to fix the cantilever 12 at the load-bearing section 15 in one position above or below respectively.

The cantilever 12 basically comprises a rectangular hollow section 19 through which it is connected to the load-bearing section 15, and a supporting plate 20 that is designed to be capable of being extended from the rectangular hollow section 19 in the manner of a telescope. A board 22 is supported pivotably on a vertical pin 21 which is fixed at the free end of the supporting plate 20, with a carrying frame 23 designed as a cage being fixed at said board 22 and being capable of moving in an approximately vertical direction. For compensating the weight of the carrying frame 23 and of an appliance held by it, provision is made of a tension-compensating spring 24, with its take-up reel 25 being located in the board 22. Said tension-compensating spring 24 reaches through an opening 26 in the board 22 and is fixed at the carrying frame 23.

The carrying frame 23 has a bottom 27 that is held pendulous on a pin 29, with the latter being arranged in the side walls 28 of the carrying frame 23. Said bottom 27 can be locked in any desired position by means of one knob 30 or by means of two knobs from both sides of the carrying frame 23. Each of the front end and the side walls 28 of the carrying frame 23 are provided with a grip handle 31 and 32, rendering it possible to push the carrying frame 23 into a desired position with ease.

Figure 2:
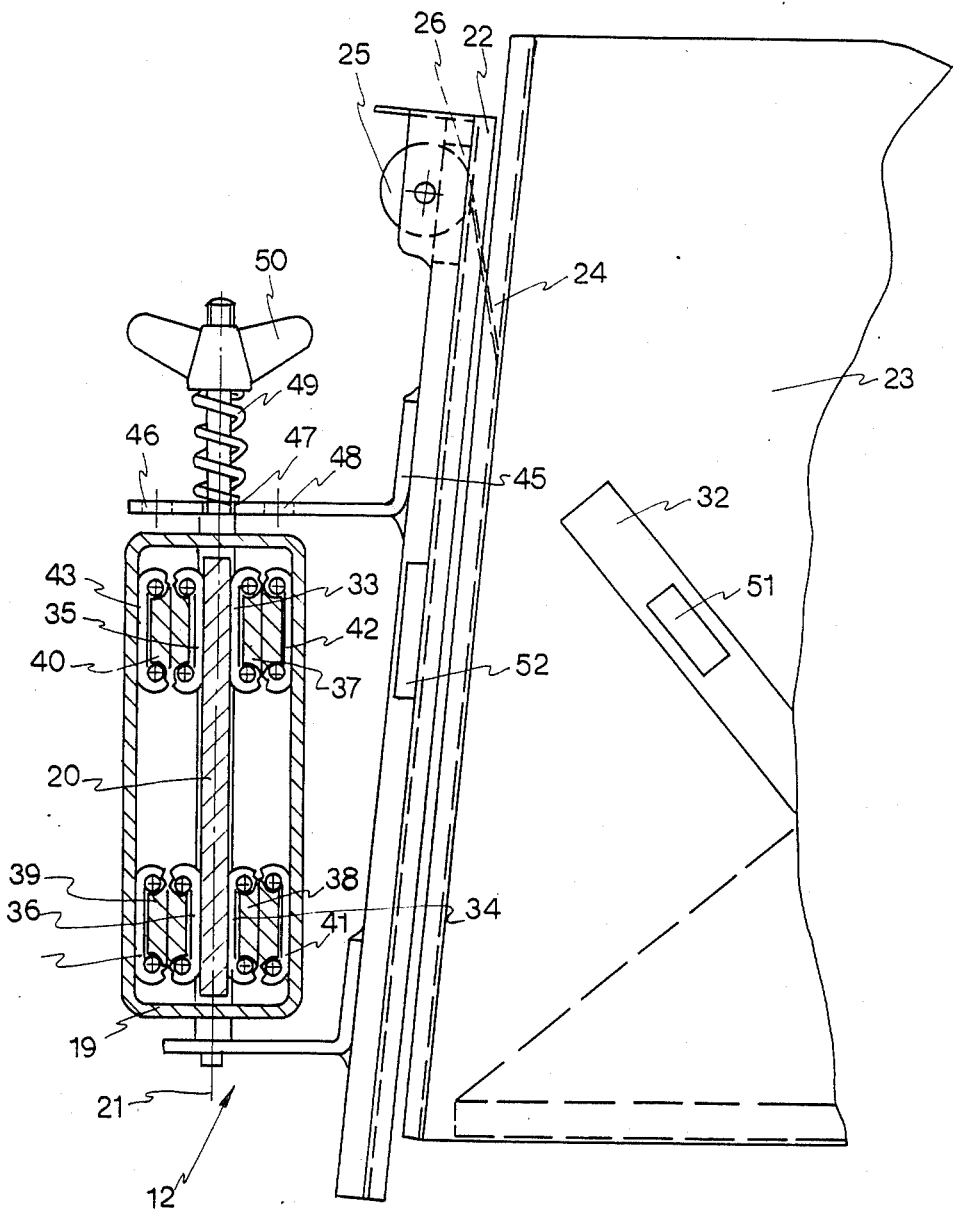
FIG. 2 is a sectional view of the swivel arm along the line II—II in FIG. 1 in an enlarged scale in relation to FIG. 1.

FIG. 2 first of all shows more details of the design of the cantilever 12. It illustrates the manner in which the supporting plate 20 is guided in the rectangular hollow section 19. For this purpose two upper rails 33, 34, 35, and 36 are provided respectively on both sides of the supporting plate 20 that grip over one extension rail 37, 38, 39, and 40 each. Furthermore the upper rails 41, 42, 43, and 44 fixed at the interior walls of the rectangular hollow section 19 grip over said extension rails 37, 38, 39, and 40. When the carrying frame 23 is being pulled out, the supporting plate 20 moves out of the rectangular hollow section 19, with the extension rails 37–40 also partly moving out of the rectangular hollow section 19 for purposes of achieving the maximum projection.

FIG. 2 furthermore shows that the board 22 is slipped onto the pin 21 at the end of the supporting plate 20 of the cantilever 12 from above by means of an angle bracket 45. Said angle bracket 45 has, for instance, three holes 46, 47, and 48 in a row that render it possible for the board 22 to be fixed at the pin 21 at a varying degree of forward inclination. The portion of the pin 21 reaching above the angle bracket 45 is provided with a coil spring 49, with the latter being capable of being tensioned at varying degrees by means of a wing nut 50 screwed onto the pin 21, so that the angle bracket is pushed downward to a varying degree, resulting in the board 22 being capable of being swiveled about the pin 21 with greater or lesser ease, as governed by the position of the nut 50.

A brake release lever 51 is arranged on the grip handle 32. Brake release lever 51 is operatively connected to a brake shoe 52 through a suitable linkage or a cable such as a bowden wire (not illustrated). When this brake release lever 51 is moved, brake shoe 52 fixed at the carrying frame 23 and normally biased against the lateral face of the board 22 lifts off the board 22, rendering it possible for the carrying frame 23 to be subsequently vertically adjusted. A corresponding brake release lever can also be provided on the grip handle 31, for instance, for purposes of releasing a brake limiting the extension travel of the supporting plate 20.

Figure 3:
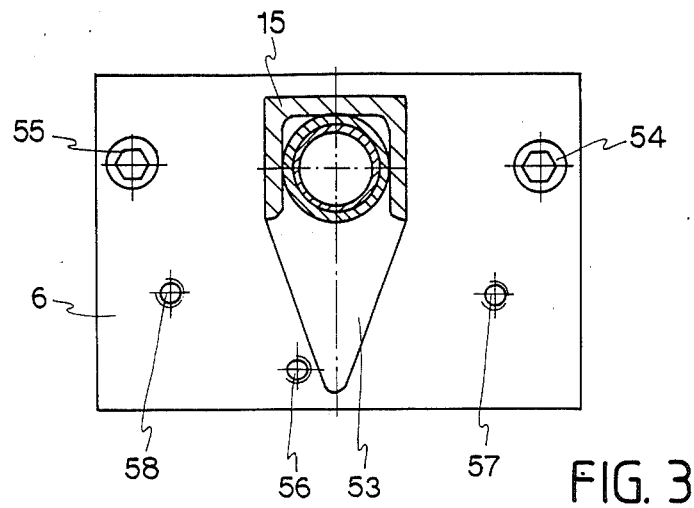
FIG. 3 is a horizontal sectional view of the vertical pillar of the swivel arm along the line III—III in FIG. 1 in an enlarged scale in relation to FIG. 1.

FIG. 3 shows a top view of the locating plate 6. It can be seen that the load-bearing section 15 has a U-shaped cross-section and a pointer 53 tapering towards the front. Pointer 53 swivels across the locating plate 6 when the cantilever 12, and hence also the load-bearing section 15, perform a swiveling movement. The swiveling travel of the pointer 53 can be limited by means of screws 54 and 55 which are screwed into the locating plate 6 from above. In order to achieve various final positions of the cantilever 12, the locating plate 6 is provided with threaded holes 56, 57, and 58 capable of accommodating the screws 54 and 55 at different positions.

Figure 4:
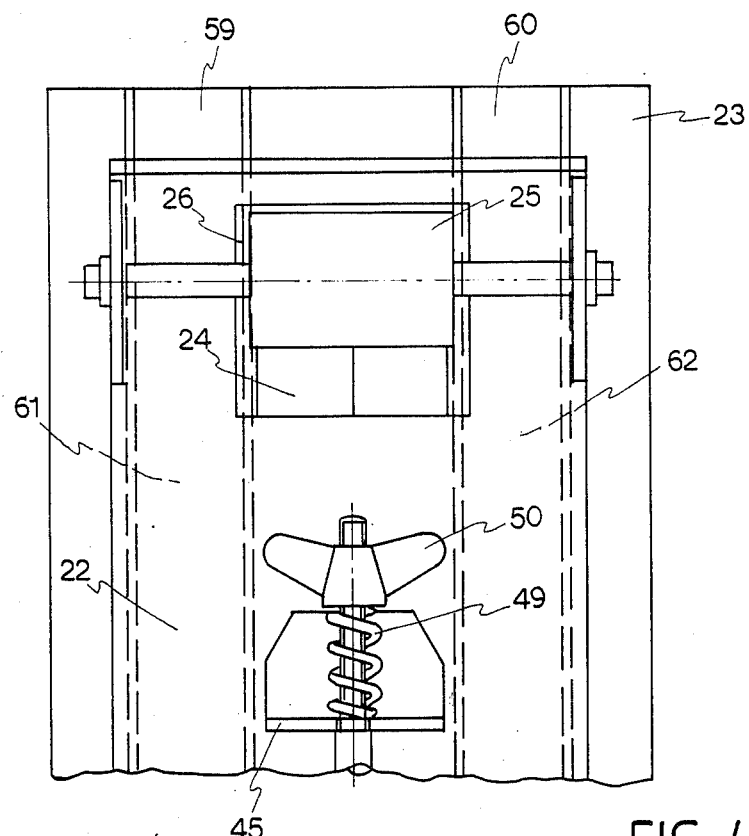
FIG. 4 is a view of the back of the carrying frame of the swivel arm in the direction of the arrow IV in FIG. 1.

FIG. 4 shows that, similar to the manner in which the supporting plate 20 is guided in the rectangular hollow section 19, guiding of the carrying frame 23 on the board 22 is effected by means of upper rails 59 and 60 on guide rails 61 and 62 of the board, said guide-rails 61, and 62 being illustrated by a broken line, hence making for smooth vertical adjustment. FIG. 4 furthermore shows the take-up reel 25 and the opening 26 in the board 22, through which the tension-compensating spring 24 reaches to the carrying frame 23. FIG. 4 also shows a more detailed illustration of the angle bracket 45, the coil spring 49 and the nut 50 with which the resistance to a swiveling movement about the axis 21 can be adjusted.

What is claimed is:

1. A swivel arm assembly (for supporting an appliance designed for use on a desk, comprising a pillar adapted to be vertically fixed on a desk, a telescope-type cantilever capable of swiveling about said pillar, a carrying frame for accommodating the appliance being provided at the end of said telescope-type cantilever, said carrying frame being fixed at the end of the cantilever and being capable of moving in an at least approximately vertical direction in relation to the cantilever.

2. A swivel arm according to claim 1, wherein the carrying frame is capable of being vertically lowered down to the desk top.

3. A swivel arm according to claim 1, wherein the end of the cantilever is provided with an at least approximately vertical board with two guide rails, with an at least approximately vertical portion of the carrying frame gripping over the latter via two upper rails.

4. A swivel arm according to claim 3, wherein a tension-compensating flat spring with an associated take-up reel is located in the board, the free end of the tension-compensating flat spring reaching through the board and being connected to the carrying frame.

5. A swivel arm according to claim 1, wherein the carrying frame is designed as a cage embracing the appliance to be held at least partially on three sides.

6. A swivel arm according to claim 1, wherein the carrying frame has a bottom capable of swiveling about a pin supported in the side walls of the cage, and means to lock said bottom in any desired position.

7. A swivel arm according to claim 6, wherein said pin is arranged in front of the vertical line of gravity of the bottom bearing the load of the appliance to be held, and wherein a tension-compensating flat spring is provided at the back of the bottom.

8. A swivel arm according to claim 1, further comprising a locating plate firmly connected to said pillar, and adapted to be placed on the desk top from above, and a clamping arm capable of moving on the pillar, said pillar extending under the desk body when mounted thereon.

9. A swivel arm according to claim 8, wherein the clamping arm comprises of two movable clamping plates, with one clamping plate having a fastening screw in a threaded through-hole near its end pointing away from the pillar with said fastening screw being capable of being pressed against the other clamping plate.

10. A swivel arm according to claim 1, wherein the cross-section of the cantilever has the shape of a rectangle pointing downward with its narrow side.

11. A swivel arm according to claim 1, wherein the cantilever consists of a rectangular hollow section and of a supporting plate of rectangular cross-section that can be extended from it.

12. A swivel arm according to claim 1, wherein on both sides of the supporting plate two upper rails are provided respectively that grip over one extension rail, the latter, in turn, being connected to upper rails provided in the interior walls of the rectangular hollow section.

13. A swivel arm according to claim 1, wherein an angle bracket provided with several holes in a row is employed to hinge the carrying frame to a pin provided at the end of the supporting plate from above and at a slightly forward inclination, so that the pin reaches through any desired hole in the angle bracket.

14. A swivel arm according to claim 13, wherein the portion of the pin reaching above the angle bracket is provided with a coil spring, the resilience of which can be adjusted by means of a nut screwed on top of the pin.

15. A swivel arm according to claim 1, wherein the carrying frame comprises a front end and two side walls which are provided with one grip handle each.

16. A swivel arm according to claim 15, wherein a brake release lever, for purposes of re-establishing the movability of the swivel arm, is provided on the grip handles.

* * * * *